United States Patent
Saeki et al.

(10) Patent No.: US 8,027,759 B2
(45) Date of Patent: *Sep. 27, 2011

(54) FUEL CELL VEHICLE SYSTEM

(75) Inventors: Hibiki Saeki, Utsunomiya (JP); Satoshi Aoyagi, Shimotsuke (JP); Yoshinobu Hasuka, Kagoshima (JP)

(73) Assignee: Honda Motor Co., Ltd., Tokyo (JP)

(*) Notice: Subject to any disclaimer, the term of this patent is extended or adjusted under 35 U.S.C. 154(b) by 724 days.

This patent is subject to a terminal disclaimer.

(21) Appl. No.: 12/100,161

(22) Filed: Apr. 9, 2008

(65) Prior Publication Data
US 2008/0257621 A1  Oct. 23, 2008

Related U.S. Application Data

(63) Continuation-in-part of application No. 11/648,212, filed on Dec. 29, 2006, now abandoned, which is a continuation of application No. 10/723,942, filed on Nov. 26, 2003, now Pat. No. 7,164,976.

(30) Foreign Application Priority Data

Nov. 29, 2002  (JP) ................. 2002-347148

(51) Int. Cl.
*B60L 11/00* (2006.01)

(52) U.S. Cl. ..... 701/22; 180/65.1; 180/65.21; 180/65.3; 702/60; 702/63; 702/64; 903/903; 903/907

(58) Field of Classification Search ........... 701/22; 180/65.12, 65.31, 65.1, 65.3, 65.21; 429/443–444, 429/428; 702/60, 63–64; 903/903, 907
See application file for complete search history.

(56) References Cited

U.S. PATENT DOCUMENTS 4,369,235 A  1/1983  Bursell et al.
(Continued)

FOREIGN PATENT DOCUMENTS

EP  0406831 A1  1/1991
(Continued)

OTHER PUBLICATIONS

Fuzzy Control of a Hybrid Power Source for Fuel Cell Electric Vehicle using Regenerative Braking Ultracapacitor; Amirabadi, Mahshid et al.; Power Electronics and Motion Control Conference, 2006. EPE-PEMC 2006. 12th International; Digital Object Identifier: 10.1109/EPEPEMC.2006.4778597; Publication Year: 2006 , pp. 1389-1394.*

(Continued)

*Primary Examiner* — Cuong H Nguyen
(74) *Attorney, Agent, or Firm* — Nelson Mullins Riley & Scarborough LLP; Anthony A. Laurentano

(57) ABSTRACT

A fuel cell vehicle system includes: a propulsion motor capable of driving a vehicle; a fuel cell which generates electric power by supplying a reactant gas to give an electrochemical reaction; an energy storage device which is charged by a generated output of the fuel cell and regenerative electric power of the propulsion motor; an output control device which controls an output current of the fuel cell; and a control device which calculates the regenerative electric power which can be generated by a regenerative operation of the propulsion motor as well as a chargeable power which can be charged to the energy storage device, controls the output control device so that the output current of the fuel cell is restricted when the chargeable power is less than the regenerative electric power, and controls the output control device so that restriction on the output current of the fuel cell is canceled when the chargeable power is equal to or greater than the regenerative electric power.

2 Claims, 10 Drawing Sheets

U.S. PATENT DOCUMENTS

| | | | |
|---|---|---|---|
| 5,248,566 | A | 9/1993 | Kumar et al. |
| 5,366,821 | A | 11/1994 | Merritt et al. |
| 5,512,145 | A | 4/1996 | Hollenberg |
| 5,602,279 | A | 2/1997 | Thaler et al. |
| 5,759,712 | A | 6/1998 | Hockaday |
| 5,843,395 | A | 12/1998 | Wang |
| 5,927,416 | A | 7/1999 | del Re et al. |
| 6,019,183 | A | 2/2000 | Shimasaki et al. |
| 6,326,763 | B1 | 12/2001 | King et al. |
| 6,348,278 | B1 | 2/2002 | LaPierre et al. |
| 6,458,478 | B1 | 10/2002 | Wang et al. |
| 6,480,767 | B2 | 11/2002 | Yamaguchi et al. |
| 6,521,369 | B1 | 2/2003 | Mercuri et al. |
| 6,627,340 | B1 | 9/2003 | Ovshinsky et al. |
| 6,686,084 | B2 | 2/2004 | Issacci et al. |
| 6,691,810 | B2 * | 2/2004 | Hasuka et al. ............... 429/430 |
| 6,808,832 | B2 | 10/2004 | Suzuki et al. |
| 6,815,100 | B2 * | 11/2004 | Aoyagi et al. ............... 429/429 |
| 6,841,292 | B2 | 1/2005 | Nelson et al. |
| 6,887,601 | B2 | 5/2005 | Moulthrop, Jr. et al. |
| 6,893,757 | B2 | 5/2005 | Kato |
| 6,908,700 | B2 | 6/2005 | Iio |
| 6,973,393 | B2 * | 12/2005 | Hasuka et al. ................. 702/63 |
| 7,083,017 | B2 * | 8/2006 | Hasuka et al. ............... 180/65.1 |
| 7,164,976 | B2 * | 1/2007 | Saeki et al. ..................... 701/22 |
| 2002/0109406 | A1 | 8/2002 | Aberle et al. |
| 2007/0129859 | A1 | 6/2007 | Saeki et al. |
| 2007/0199747 | A1 * | 8/2007 | Aoyagi et al. ............... 180/65.3 |
| 2008/0257621 | A1 * | 10/2008 | Saeki et al. .................. 180/65.3 |

FOREIGN PATENT DOCUMENTS

| | | |
|---|---|---|
| EP | 578837 A1 | 1/1994 |
| EP | 1207578 A2 | 5/2002 |
| JP | 7-245808 | 9/1995 |
| JP | 2001-357865 | 12/2001 |
| JP | 2002-034171 | 1/2002 |
| JP | 2002-260696 | 9/2002 |
| JP | 2004-180475 | 6/2004 |
| WO | WO-01/34424 A1 | 5/2001 |
| WO | WO-02/11267 A2 | 2/2002 |

OTHER PUBLICATIONS

Power Management Strategy with Regenerative Braking for Fuel Cell Hybrid Electric Vehicle; Yu Shuang et al.; Power and Energy Engineering Conference, 2009. APPEEC 2009. Asia-Pacific; Digital Object Identifier: 10.1109/APPEEC.2009.4918610 Publication Year: 2009 , pp. 1-4.*

A novel design and feasibility analysis of a fuel cell plug-in hybrid electric vehicle; Di Wu; Williamson, S.S.; Vehicle Power and Propulsion Conference, 2008. VPPC '08. IEEE; Digital Object Identifier: 10.1109/VPPC.2008.4677706; Publication Year: 2008 , pp. 1-5.*

Power management and economic estimation of fuel cell hybrid vehicle using fuzzy logic; Xiangjun Li et al.; Vehicle Power and Propulsion Conference, 2009. VPPC '09. IEEE; Digital Object Identifier: 10.1109/VPPC.2009.5289696; Publication Year: 2009 , pp. 1749-1754.*

Bromberg, L. et al., Plasma reforming of diesel fuel, Proc. of the 1999 US DOE Hydrogen Program Review, NREL/CP-570-2693.

Berlowitz, P.J. et al., Fuel choices for fuel cell powered vehicles, Society of Automotive Engineers. Paper 2000-01-0003.

Edlund, David J. et al., "An Integrated Fuel Processor for PEM Fuel Cells," retrieved online at http://www.netl.doe.gov/publications/proceedings/97/97fc/FC7-6.PDF (2007).

Tomy Sebastian et al., Comparison and dual-converter-based power supply systems, IEEE Trans. on Industry Applications, Mar. 1989, pp. 339-347 (from Dialog(R) File 8, acc. No. 02803305).

Japanese Office Action transmitted on Jun. 6, 2006 in corresponding application JP 2002-347148.

Burke, Kenneth A., "High Energy Density Regenerative Fuel Cell Systems for Terrestrial Applications," *Aerospace and Electronic Systems Magazine, IEEE*, vol. 14(12):23-34 (1999).

Farooque, Mohammad et al., "Fuel Cells—The Clean and Efficient Power Generators," *Proceedings of the IEEE*, vol. 89(12):1819-1829 (2001).

Fox, H.W. et al., "Fuel Cells," *IRE Transactions on Component Parts*, vol. 8(4):162-174 (1961).

Grimes, Patrick G., "Historical Pathways for Fuel Cells, The New Electric Century," *IEEE AES Systems Magazine*, vol. 15(12):7-10 (2000).

Hazard, Herbert R., "Propulsion Aspects of Transportation," *Proceedings of the IEEE*, vol. 56(4):523-535 (1968).

Hoolboom, G.J. et al., "Non-polluting Automobiles," *IEEE Transactions on Vehicular Technology*, vol. 43(4):1136-1144 (1994).

Justi, Eduard W., "Fuel Cell Research in Europe," *Proceedings of the IEEE*, vol. 51(5):784-795 (1963).

Koeneman, Paul B. et al., "Feasibility of Micro Power Supplies for MEMS," *Journal of Microelectromechanical Systems*, vol. 6(4):355-362 (1997).

McElroy, James F., "Fuel Cell Power Plants for Automotive Applications," *IEEE Transactions on Vehicular Technology*, vol. VT-32 (1):33-41 (1983).

Oman, Henry, "New Applications for Fuel Cells, News from the 34th Intersociety Energy Conversion Engineering Conference," *IEEE AES Systems Magazine*, vol. 14(12):15-22 (1999).

Peattie, C. Gordon, "A Summary of Practical Fuel Cell Technology to 1963," *Proceedings of the IEEE*, vol. 51(5):795-806 (1963).

Ramakumar, R. et al., "Solar Energy Conversion and Storage Systems for the Future," *IEEE Transactions on Power Apparatus and Systems*, vol. PAS-94(6):1926-1934 (1975).

Simon, William E. et al., "Manned Spacecraft Electrical Power Systems," *Proceedings of the IEEE*, vol. 75(3):277-307 (1987).

Will, Fritz G., "Recent Advances in Zinc/Air Batteries," *The Thirteenth Annual Battery Conference on Applications and Advances*, pp. 1-6 (1998).

* cited by examiner

I-V CHARACTERISTIC OF FUEL CELL

FUEL CELL VEHICLE SYSTEM

CROSS REFERENCE TO RELATED APPLICATIONS

This is a Continuation-in-Part application of U.S. patent application Ser. No. 11/648,212, filed Dec. 29, 2006, which is a Continuation application of U.S. patent application Ser. No. 10/723,942, filed Nov. 26, 2003 and claiming priority on Japanese Patent Application No. 2002-347148, filed Nov. 29, 2002, the contents of aforementioned applications are entirely incorporated herein by reference.

BACKGROUND OF THE INVENTION

1. Field of the Invention

The present invention relates to a fuel cell vehicle system.

2. Description of the Related Art

A solid polymer membrane fuel cell conventionally includes, for example, cells formed by sandwiching a solid polymer electrolyte membrane between a fuel electrode (anode) and an oxygen electrode (cathode), with a plurality of such cells arranged in a stack. Hydrogen is supplied to the fuel electrode as fuel, and air is supplied to the oxygen electrode as oxidant, and hydrogen ions generated by a catalytic reaction at the fuel electrode pass through the solid polymer electrolyte membrane and migrate to the oxygen electrode, causing an electrochemical reaction with the oxygen at the oxygen electrode, and generating electricity.

As a fuel cell vehicle provided with such a fuel cell as a source of motive power, heretofore there is known a fuel cell vehicle, fitted with a capacitor including for example an electric double layer capacitor or an electrolytic capacitor or the like, and constructed so as to store the electrical energy generated by the fuel cell, and transfer electrical energy to the propulsion motor (see for example, Patent document 1).

In such a fuel cell vehicle, the capacitor is connected in parallel to the fuel cell via an output controller which controls the output current and output voltage of the fuel cell, and output control action such as chopping action or the like of the output controller which includes, for example, a chopper type power conversion circuit, is controlled corresponding to the state of, for example, the fuel cell vehicle, the fuel cell, or the capacitor.

[Patent document 1] Japanese Unexamined Patent Application, First Publication No. 2001-357865.

In practice, at the time of travelling and the like of the fuel cell vehicle according to the example of the aforementioned technology, in the case of a condition where the output current extracted from the fuel cell is not restricted by the output controller, that is the fuel cell and an energy storage device (e.g., a capacitor, battery, etc.) are in a directly connected condition, the terminal voltage of the energy storage device and the output voltage of the fuel cell become the same value.

Therefore, if for example the energy storage device is charged by the regeneration of the propulsion motor, then both the terminal voltage of the energy storage device and the output voltage of the fuel cell increase. At this time the setting is such that a command value for the output current corresponding to the increased output voltage based on predetermined power generation characteristics for the output current and output voltage, is input to the fuel cell, so that the relative relationship for the output current and the output voltage does not deviate from a predetermined power generation characteristic.

However, in the case where during regeneration of the propulsion motor, the power generation of the fuel cell continues, and for example the regenerative electric power of the propulsion motor is greater than the chargeable power which can be charged to the energy storage device, there is the possibility that unnecessary power generation continues, so that the energy efficiency of the fuel cell vehicle drops.

SUMMARY OF THE INVENTION

The present invention takes into consideration the above situation with the object of providing a fuel cell vehicle system which can improve the energy efficiency of a fuel cell vehicle during regeneration by the propulsion motor.

To solve the aforementioned problems and achieve the related object, the present invention provides a fuel cell vehicle system including: a propulsion motor capable of driving a vehicle; a fuel cell which generates electric power by supplying a reactant gas to give an electrochemical reaction; an energy storage device which is charged by a generated output of the fuel cell and regenerative electric power of the propulsion motor; an output control device which controls an output current of the fuel cell; and a control device which calculates the regenerative electric power which can be generated by a regenerative operation of the propulsion motor as well as a chargeable power which can be charged to the energy storage device, controls the output control device so that the output current of the fuel cell is restricted when the chargeable power is less than the regenerative electric power, and controls the output control device so that restriction on the output current of the fuel cell is canceled when the chargeable power is equal to or greater than the regenerative electric power.

According to the fuel cell vehicle system of the above configuration, in the case where the chargeable power which can be charged to the energy storage device is greater than the regenerative electric power which can be generated by the regenerative operation of the propulsion motor, the restriction on the output current of the fuel cell is cancelled, so that the energy storage device can be promptly charged by the power generation of the fuel cell and by the regenerative operation of the propulsion motor.

On the other hand, when the chargeable power is less than the regenerative electric power, the output current of the fuel cell is restricted, to thereby prevent the energy storage device being over charged by the power generation of the fuel cell, and thus enable the energy efficiency of the fuel cell vehicle during regenerative operation of the propulsion motor to be improved.

Furthermore, the present invention provides a fuel cell vehicle system including: a propulsion motor capable of driving a vehicle; a fuel cell which includes fuel cell units, each of which includes a fuel electrode and an oxygen electrode, and generates electric power by supplying a reactant gas to give an electrochemical reaction; an energy storage device which is charged by a generated output of the fuel cell and regenerative electric power of the propulsion motor; a reactant gas supply device which supplies the reactant gas to the fuel cell; a pressure detection device which detects a pressure of the reactant gas supplied to the fuel electrode of the fuel cell; an output control device which controls an output current of the fuel cell; and a control device which calculates the regenerative electric power which can be generated by a regenerative operation of the propulsion motor as well as a chargeable power which can be charged to the energy storage device, controls the reactant gas supply device so that supply of the reactant gas to the oxygen electrode of the fuel cell is stopped and controls the output control device so that the output current of the fuel cell is restricted when the chargeable power is less than the regenerative electric power and the pressure of the reactant gas detected by the pressure detection device is equal to or less than a predetermined value, and controls the output control device so that restriction on the output current of the fuel cell is canceled when the chargeable power is equal to or greater than the regenerative electric power or the chargeable power is less than the regenerative electric power and the pressure of the reactant gas detected by the pressure detection device is greater than the predetermined value.

According to the fuel cell vehicle system of the above configuration, in the case where the chargeable power which can be charged to the energy storage device is greater than the regenerative electric power which can be generated by the regenerative operation of the propulsion motor, the restriction on the output current of the fuel cell is cancelled, so that the energy storage device can be promptly charged by the power generation of the fuel cell and by the regenerative operation of the propulsion motor. Furthermore, in the case where the pressure of the reactant gas at the fuel electrode of the fuel cell is greater than the predetermined pressure, even though the chargeable output power is less than the regenerative output power, the restriction on the output current of the fuel cell is cancelled, and reactant gas is supplied to the oxygen electrode by means of a power generation command corresponding to the pressure of the reactant gas at the fuel electrode. Moreover, by continuing the power generation, the electrode gap differential pressure due to the reactant gas between the fuel electrode and the oxygen electrode of the fuel cell can be prevented from increasing excessively.

On the other hand, when the chargeable power is less than the regenerative electric power and the pressure of the reactant gas at the fuel electrode of the fuel cell is less than a predetermined pressure, supply of the reactant gas to the oxygen electrode of the fuel cell is stopped, and the output current of the fuel cell is restricted. As a result, excessive charging of the energy storage device due to the power generation of the fuel cell can be prevented, and the energy efficiency of the fuel cell vehicle at the time of regenerative operation of the propulsion motor can be improved. Furthermore, by restricting the output current by means of the output control device, a situation where power generation stops due to the pressure of the reactant gas at the fuel electrode becoming less than the predetermined pressure, or an excessive current is extracted from the restricted fuel cell, can be prevented, so that the fuel cell can be maintained in an appropriate condition.

DETAILED DESCRIPTION OF THE INVENTION

The following describes a fuel cell vehicle system according to a first embodiment of the present invention, with reference to the appended drawings.

Figure 1:
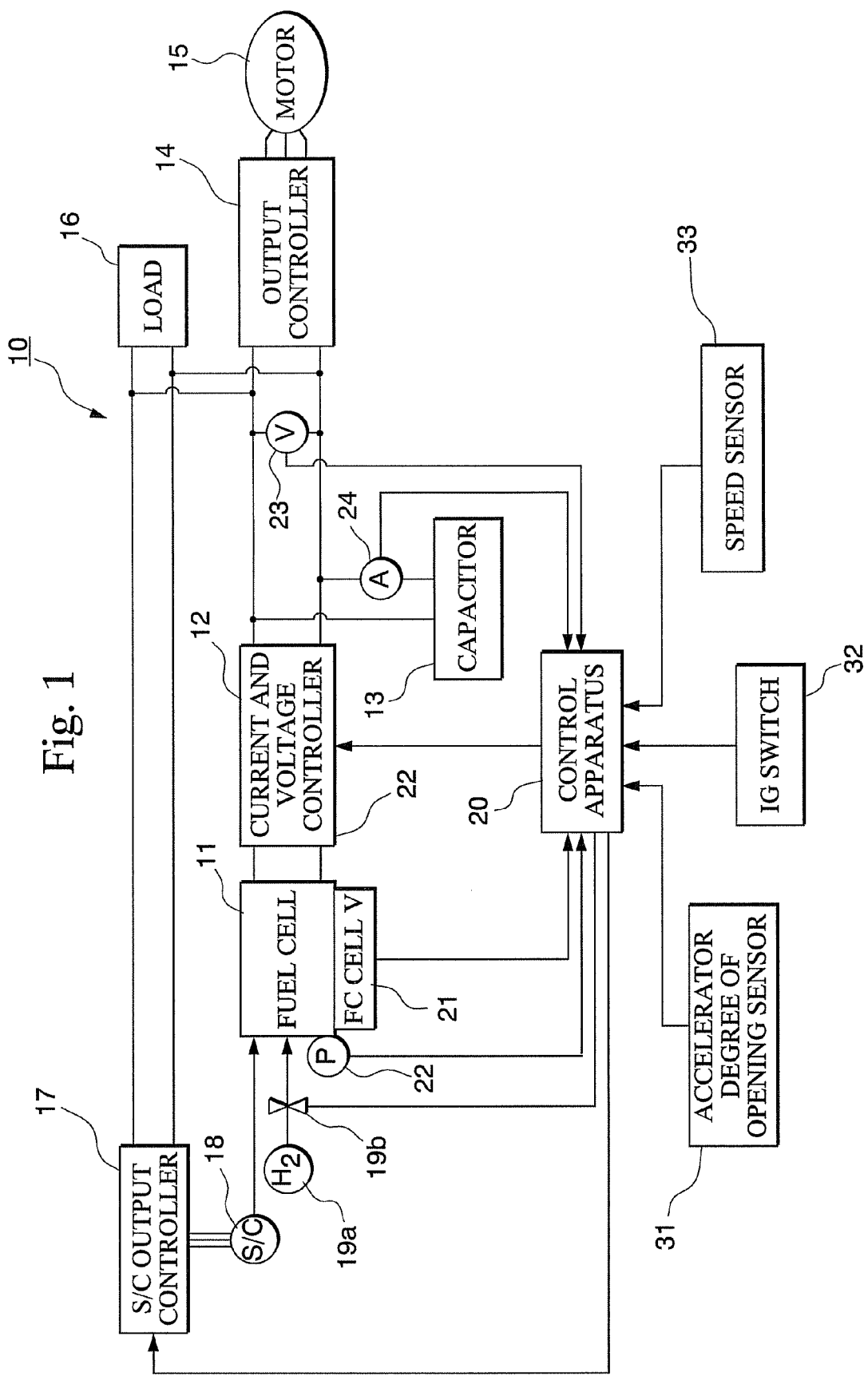
FIG. 1 is a block diagram of a fuel cell vehicle system according to a first embodiment of the present invention.

A fuel cell vehicle system 10 according to the first embodiment includes for example as shown in FIG. 1; a fuel cell 11, a current and voltage controller 12, a capacitor 13, an output controller 14, a propulsion motor 15, a load 16, an S/C output controller 17, an air compressor (S/C) 18, a hydrogen tank 19a and hydrogen supply valve 19b, a control apparatus 20, a fuel cell unit voltage sensor 21, an anode voltage sensor 22, a capacitor voltage sensor 23, a capacitor current sensor 24, a degree of opening of the accelerator sensor 31, an IG switch 32, and a speed sensor 33.

The fuel cell 11 includes a stack of fuel cell units made up with an electrolyte electrode structure holding a solid polymer electrolyte membrane formed from a positive ion exchange membrane or the like sandwiched between a fuel electrode (anode) formed from an anode catalyst and gas diffusion layer, and an oxygen electrode (cathode) formed from a cathode catalyst and gas diffusion layer, which is further sandwiched between a pair of separators.

The anode of the fuel cell 11 is supplied with fuel gas (reactant gas) including hydrogen, from the high-pressure hydrogen tank 19a via the hydrogen supply valve 19b. Hydrogen ionized by the catalytic reaction on the anode catalyst of the anode migrates to the cathode via an appropriately humidified solid polymer electrolyte membrane, and electrons released in association with this migration are extracted to an external circuit and used as DC electrical energy. The cathode is supplied with, for example, air as an oxidizing gas (reactant gas) containing oxygen, by the air compressor (S/C) 18, and the hydrogen ions, electrons, and oxygen react at the cathode to form water.

The generated current (output current) extracted from the fuel cell 11 is input to the current and voltage controller 12. The current and voltage controller 12 is connected to a capacitor 13 including, for example, multiple capacitor cells formed from electric double layer capacitors or electrolytic capacitors or the like connected mutually in series.

The fuel cell 11, the current and voltage controller 12, and the capacitor 13 are connected in parallel to the propulsion motor 15 via the output controller 14, the load 16 including various auxiliary equipment, for example, a cooling device for the fuel cell 11 and the capacitor 13 (not shown in drawings) and an air conditioner (not shown in drawings), and the air compressor (S/C) 18 via the S/C output controller 17.

The current and voltage controller 12 includes, for example, a chopper type power conversion circuit wherein the value of the output current extracted from the fuel cell 11 is controlled by the chopping action of the chopper type power conversion circuit, in other words, by the on/off action of a switching device provided in the chopper type power conversion circuit. This chopping action is controlled in accordance with a duty ratio, in other words, on/off ratio, of the control pulse input from the control apparatus 20.

For example, when the extraction of output current from the fuel cell 11 is prevented, setting the duty ratio of the control pulse input from the control apparatus 20 to 0% results in the switching device provided in the chopper type power conversion circuit being held in the off condition, and the fuel cell 11 and the capacitor 13 are electrically disconnected. On the other hand, setting the duty ratio of the control pulse to 100% results in the switching device being held in the on condition, in effect directly connecting the fuel cell 11 and the capacitor 13. Thus the output voltage of the fuel cell 11 and the capacitor 13 terminal voltage assume the same value.

Furthermore, when the duty ratio of the control pulse is set appropriately between 0% and 100%, the current and voltage controller 12 restricts the output current of the fuel cell 11, in other words, the primary current, as appropriate in accordance the duty ratio of the control pulse, and the restricted current thus obtained is output as the secondary current.

The output controller 14 is provided with, for example, a PWM inverter which uses pulse width modulation (PWM), and controls the drive and regenerative action of the propulsion motor 15 corresponding to control commands output from the control apparatus 20. For example, when the propulsion motor 15 is driven, DC power output from the current and voltage controller 12 and the capacitor 13 is converted to three-phase AC power based on a torque command input from the control apparatus 20, and supplied to the propulsion motor 15. On the other hand, during regeneration with the propulsion motor 15, the three-phase AC power output from the propulsion motor 15 is converted to DC power and supplied to the capacitor 13 to charge the capacitor 13.

The propulsion motor 15 is, for example, a permanent magnet type three-phase AC synchronous motor using a permanent magnet as a field magnet, and is driven and controlled with three-phase AC power supplied from the output controller 14. Additionally, when drive power is transmitted to the propulsion motor 15 from the drive wheels during deceleration of the vehicle, the propulsion motor 15 functions as a generator, producing so called regenerative braking power, recovering the kinetic energy of the vehicle in the form of electrical energy.

Moreover, the air compressor 18 takes, for example, air from outside the vehicle, compresses it, and supplies this air to the cathode of the fuel cell 11 as reactant gas.

The speed of rotation of the motor (not shown in drawings) driving this air compressor 18 is controlled by the S/C output controller 17, provided with, for example, a PWM inverter which uses pulse width modulation (PWM), based on control commands output from the control apparatus 20.

The control apparatus 20 outputs a command value for the flow of the reactant gas supplied from the air compressor 18 to the fuel cell 11, and a command value for the opening of the hydrogen supply valve 19*b*, based on, for example, the operating state of the vehicle, the concentration of hydrogen in the reactant gas supplied to the anode of the fuel cell 11, the concentration of hydrogen in the gas discharged from the anode of the fuel cell 11, and the state of power generation of the fuel cell 11, for example, the terminal voltage of each of the multiple fuel cell units, the output current extracted from the fuel cell 11, the pressure of reactant gas supplied to the anode, and the like, to thereby control the state of power generation of the fuel cell 11.

Furthermore, the control apparatus 20 outputs control pulses to control the power conversion operation of the current and voltage controller 12, based on a power generation command for the fuel cell 11, to thereby control the value of the current output from the fuel cell 11.

Moreover, the control apparatus 20 controls the power conversion operation of the PWM inverter provided in the output controller 14, and when, for example, the propulsion motor 15 is driven, computes a torque command based on a signal for the degree of opening of the accelerator associated with the amount of pressing of the accelerator pedal by the driver. The control apparatus 20 then inputs this torque command to the output controller 14. As a result, a pulse width modulation signal corresponding to the torque command is input to the PWM inverter, and various phase currents required to produce the requested torque are output to each phase of the propulsion motor 15.

Furthermore, the control apparatus 20 controls the regenerative operation of the propulsion motor 15 based on the travelling state of the vehicle, for example the speed of the vehicle (speed), or the state of the capacitor 13, for example, the temperature of the capacitor 13, the total voltage being the sum of the capacitor unit voltages of the multiple capacitor units, in other words, the detected value of the terminal voltage of the capacitor 13, the detected value of the current charged to the capacitor 13, or the like.

Therefore, to the control apparatus 20 is input for example: a detection signal output from the fuel cell unit voltage sensor 21 which detects the terminal voltage (fuel cell unit voltage) of the multiple fuel cell units including the fuel cell 11; a detection signal output from the output current sensor (not shown in drawings) which detects the value of the output current extracted from the fuel cell 11; a detection signal output from the output voltage sensor (not shown in drawings) which detects the output voltage of the fuel cell 11; a detection signal output from the capacitor voltage sensor 23 which detects the terminal voltage of the capacitor 13; a detection signal output from the capacitor current sensor 24 which detects the capacitor current charged to the capacitor 13; a detection signal output from the capacitor temperature sensor (not shown in drawings) which detects the temperature of the capacitor 13; a detection signal output from the degree of opening of the accelerator sensor 31; a signal output from the IG switch 32 which instructs commencement of operation of the vehicle, and a detection signal output from the speed sensor 33.

Moreover, as described below, the control apparatus 20, at the time of regenerative operation of the propulsion motor 15 such as during deceleration of the fuel cell vehicle, calculates the regenerative electric power which can be generated based on the vehicle condition, for example on the speed of the vehicle or the like. Furthermore, the control apparatus 20 calculates the chargeable power which can be charged to the capacitor 13 based for example on the detected value of the terminal voltage of the capacitor 13 or the like.

Then, the control apparatus 20, in the case where the chargeable power which can be charged to the capacitor 13 is greater than the regenerative electric power which can be generated by the propulsion motor 15, makes the duty ratio of the control pulse output to the current and voltage controller 12, 100%, and sets the fuel cell 11 and the capacitor 13 to a directly connected condition. Moreover, the control apparatus 20 outputs to the S/C output controller 17 a power generation command corresponding to the detection value of the terminal voltage of the capacitor 13 which has become the same value as the output voltage of the fuel cell 11, to perform supply of reactant gas in accordance with the power generation command, so that the capacitor 13 is charged by the power generation power of the fuel cell 11 and the regenerative electric power of the propulsion motor 15.

On the other hand, in the case where the chargeable power which can be charged to the capacitor 13 is less than the regenerative electric power which can be generated by the propulsion motor 15, the control apparatus 20 makes the duty ratio of the control pulse input to current and voltage controller 12, 0%, to electrically disconnect the fuel cell 11 and the capacitor 13, and prohibit charging of the capacitor 13 by the power generation power of the fuel cell 11.

The fuel cell vehicle system 10 according to the first embodiment has the aforementioned configuration. Next is a description of the operation of the fuel cell vehicle system 10, in particular the operation during travelling of the fuel cell vehicle, with reference to the appended drawings.

Figure 2:
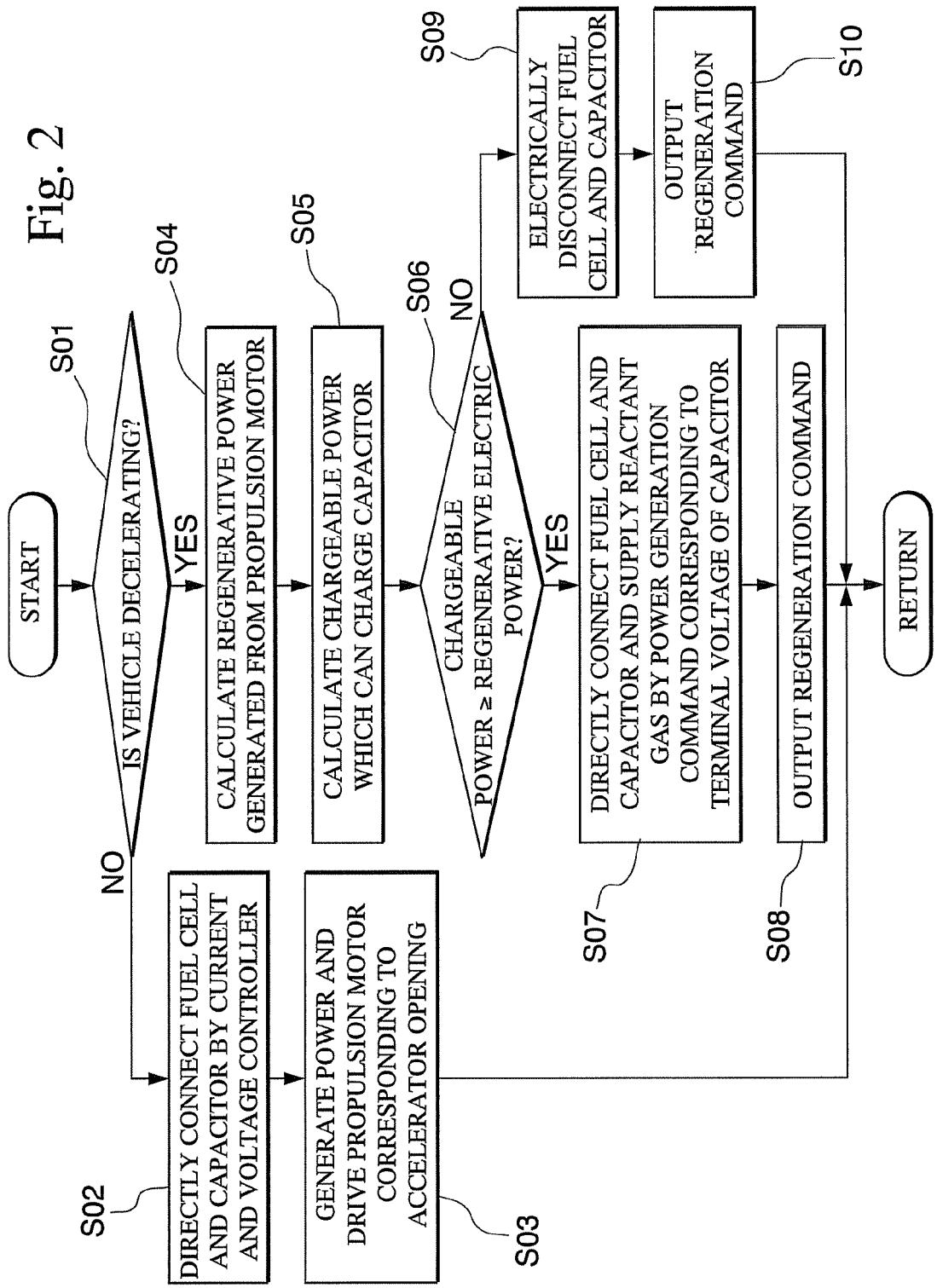
FIG. 2 is a flowchart showing an operation of the fuel cell vehicle system shown in FIG. 1.

At first, in step S01 of FIG. 2, it is determined whether or not the fuel cell vehicle is decelerating, according to for example a time change of the opening of the accelerator related to the accelerator operation amount of the driver, or for example the direction of the current being charged to the capacitor 13, that is whether this is a charging current or a discharge current, or the like.

If the determination result is YES, the flow proceeds to the next step S04.

On the other hand if the determination result is NO, the flow proceeds to step S02.

In step S02, the duty ratio of the control pulse input to current and voltage controller 12 is set to 100%, and the fuel cell 11 and the capacitor 13 are set to a directly connected condition.

Then, in step S03, a power generation command corresponding for example to the degree of opening of the accelerator related to the accelerator operation amount of the driver or the like, is output to the S/C output controller 17, and also a torque command corresponding to the degree of opening of the accelerator or the like is output to the output controller 14, so that the propulsion motor 15 is driven by the power supply from the fuel cell 11, and this series of processing then ends.

Furthermore, in step S04, based on the vehicle travelling conditions, for example the speed of the vehicle or the like, the regenerative electric power which can be generated by the regenerative operation of the propulsion motor 15 is calculated.

Next, in step S05, based for example on the detection value of the terminal voltage of the capacitor 13 or the like, the chargeable power which can be charged to the capacitor 13 is calculated.

Then, in step S06, it is determined whether or not the chargeable power which can be charged to the capacitor 13 is greater than the regenerative electric power which can be generated by the propulsion motor 15.

In the case where the determination result is NO, the flow proceeds to the next step S09.

On the other hand, in the case where the determination result is YES, the flow proceeds to step S07.

In step S07, the duty ratio of the control pulse output to the current and voltage controller 12 is set to 100%, and the fuel cell 11 and the capacitor 13 are set to the directly connected condition, and also a power generation command corresponding to the detection value of the terminal voltage of the capacitor 13 which has become the same value as the output voltage of the fuel cell 11, is output to the S/C output controller 17, and supply of reactant gas is performed corresponding to the power generation command for the fuel cell 11, so that the capacitor 13 is charged by the power generation power of the fuel cell 11.

Then, in step S08, a regeneration command is output to the output controller 14, and the three phase AC power output from the propulsion motor 15 due to the regeneration operation, is converted to DC regenerative electric power by the output controller 14, and the capacitor 13 is charged by this regenerative electric power, and the series of processing ends.

Furthermore, in step S09, the duty ratio of the control pulse input to current and voltage controller 12 is set to 0%, and the fuel cell 11 and the capacitor 13 are electrically disconnected, so that charging of the capacitor 13 by means of the power generation power of the fuel cell 11 is prohibited.

Then, in step S10, a regeneration command is output to the output controller 14, and the three phase AC power output from the propulsion motor 15 due to the regenerative operation is converted to DC regenerative power by the output controller 14, and the capacitor 13 is charged by this regenerative electric power, and the series of processing ends.

As described above, according to the fuel cell vehicle system 10 of the first embodiment, in the case where the chargeable power which can be charged to the capacitor 13 is greater than the regenerative electric power which can be generated by the regeneration operation of the propulsion motor, the restriction on the output current of the fuel cell 11 is cancelled, so that the capacitor 13 can be quickly charged by the power generation power of the fuel cell 11 and the regenerative electric power of the propulsion motor 15.

On the other hand, when the chargeable power is less than the regenerative electric power, the output current of the fuel cell 11 is restricted to zero. As a result the capacitor being over charged by the power generation of the fuel cell can be prevented, and the energy efficiency of the fuel cell vehicle during regenerative operation of the propulsion motor 15 can be improved.

In the above described first embodiment, in the case where the chargeable power which can be charged to the capacitor 13 is less than the regenerative electric power which can be generated by the propulsion motor 15, charging of the capacitor 13 by the power generation power of the fuel cell 11 is simply prohibited. However, this is not limiting, and for example as in the flowchart shown in FIG. 3 showing the operation of the fuel cell vehicle system 10 according to a modified example of the first embodiment, the operation of current and voltage controller 12 may further be controlled corresponding to the electrode gap differential pressure of the anode and cathode of the fuel cell 11.

In this modified example of the first embodiment, the point different from the first embodiment is that in the case where the determination result in step S06 is NO, the flow proceeds to step S21.

Hereunder, parts the same as for the first embodiment are denoted by the same reference symbols, and description is omitted.

Figure 3:
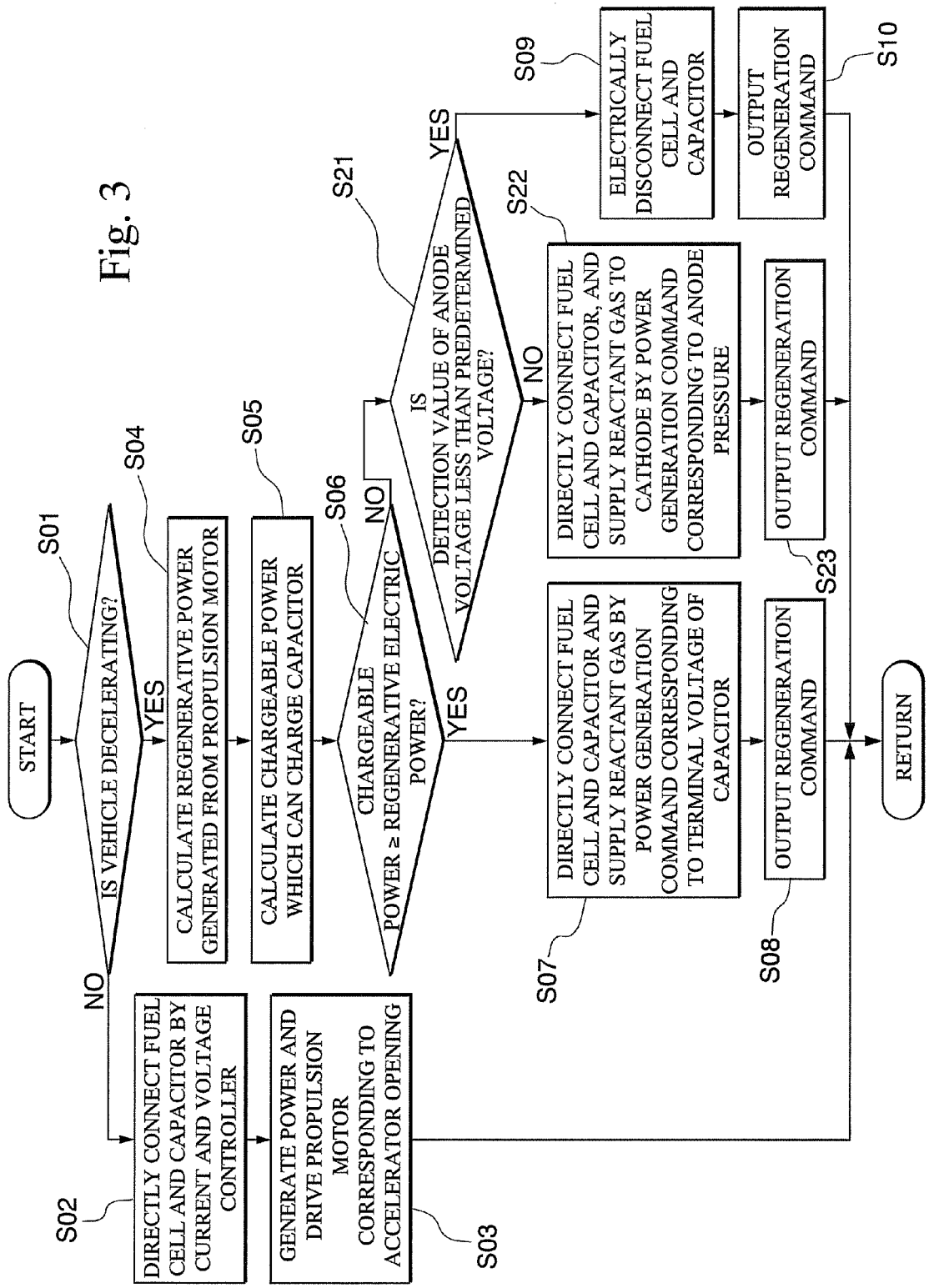
FIG. 3 is a flowchart showing an operation of the fuel cell vehicle system according to a modified example of the first embodiment.

That is to say, in step S21 in FIG. 3, it is determined whether or not the detection result of the pressure (anode pressure) of the reactant gas at the anode of the fuel cell 11 is less than a predetermined pressure.

In the case where the determination result is YES, the flow proceeds to the aforementioned step S09.

On the other hand, in the case where the determination result is NO, the flow proceeds to step S22.

In step S22, the duty ratio of the control pulse input to current and voltage controller 12 is made 100% so that the fuel cell 11 and the capacitor 13 are set to the directly connected condition. Also the power generation command corresponding to the detection value of the anode pressure is output to the S/C output controller 17, and supply of reactant gas (air) is performed corresponding to the power generation command for the cathode of the fuel cell 11, so that power generation is performed in a condition where the differential pressure of the electrode gap of the anode and the cathode of the fuel cell 11 is maintained at a predetermined differential pressure condition, and the capacitor 13 is charged by the power generation power of the fuel cell 11.

Then, in step S23, a regeneration command is output to the output controller 14, and the three phase AC power output from the propulsion motor 15 is converted to DC regenerative power by means of the output controller 14, and the capacitor 13 is then charged by this regenerative electric power, and the series of processing ends.

That is, in the case where the pressure of the hydrogen at the anode of the fuel cell 11 is greater than a predetermined pressure, even though the chargeable power is less than the regenerative electric power, the restriction on the output current of the fuel cell 11 is cancelled so that power generation continues. As a result, an excessive increase in the differential pressure of the electrode gap between the anode and the cathode of the fuel cell 11 can be prevented.

Next, a fuel cell vehicle system according to a second embodiment of the present invention will be described with reference to the appended drawings. It should be noted that parts the same as for the first embodiment are denoted by the same reference symbols, and detailed description is omitted.

Figure 4:
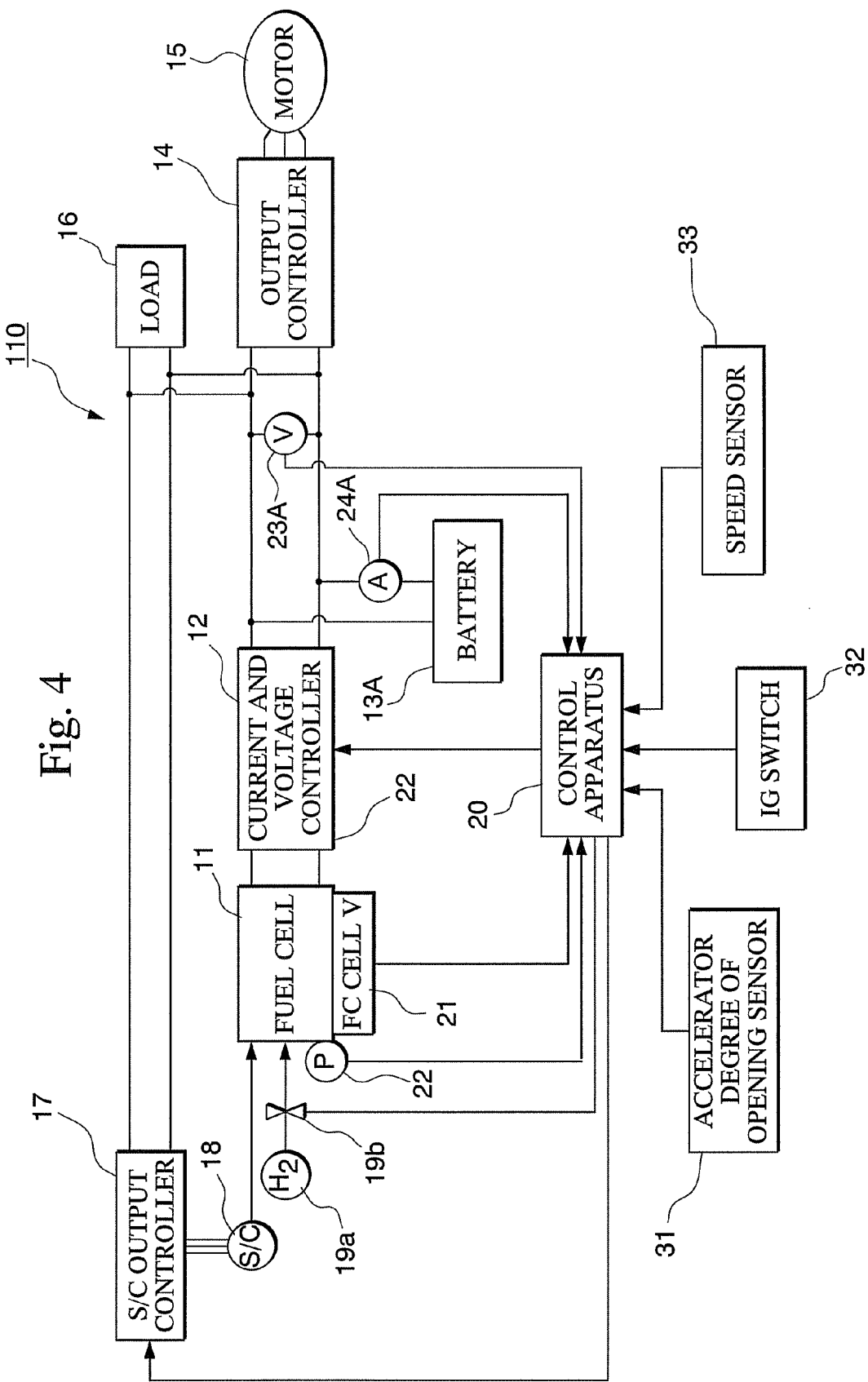
FIG. 4 is a block diagram of a fuel cell vehicle system according to a second embodiment of the present invention.

As shown in FIG. 4, a fuel cell vehicle system 110 according to the second embodiment includes a battery 13A as an energy storage device instead of the capacitor 13 in the first embodiment. More specifically, the fuel cell vehicle system 110 according to the second embodiment includes: the fuel cell 11, the current and voltage controller 12, the battery 13A, the output controller 14, the propulsion motor 15, the load 16, an S/C output controller 17, the air compressor (S/C) 18, the hydrogen tank 19a and hydrogen supply valve 19b, the control apparatus 20, the fuel cell unit voltage sensor 21, the anode voltage sensor 22, a battery voltage sensor 23A, a battery current sensor 24A, the degree of opening of the accelerator sensor 31, the IG switch 32, and the speed sensor 33. Other components are identical to that of the first embodiment.

The generated current (output current) extracted from the fuel cell 11 is input to the current and voltage controller 12. The current and voltage controller 12 is connected to the battery 13A (e.g., a nickel hydride battery, a lithium ion battery, an lead acid battery, etc.).

The fuel cell 11, the current and voltage controller 12, and the battery 13A are connected in parallel to the propulsion motor 15 via the output controller 14, the load 16 including various auxiliary equipment, for example, a cooling device for the fuel cell 11 and the battery 13A (not shown in drawings) and an air conditioner (not shown in drawings), and the air compressor (S/C) 18 via the S/C output controller 17.

The current and voltage controller 12 includes, for example, a chopper type power conversion circuit wherein the value of the output current extracted from the fuel cell 11 is controlled by the chopping action of the chopper type power conversion circuit, in other words, by the on/off action of a switching device provided in the chopper type power conversion circuit. This chopping action is controlled in accordance with a duty ratio, in other words, on/off ratio, of the control pulse input from the control apparatus 20.

For example, when the extraction of output current from the fuel cell 11 is to be restricted, the duty ratio of the control pulse input from the control apparatus 20 may be set to 20%, 30%, etc. Setting the duty ratio of the control pulse input from the control apparatus 20 to 0% results in the switching device provided in the chopper type power conversion circuit being held in the off condition, and the fuel cell 11 and the battery 13A are electrically disconnected. On the other hand, setting the duty ratio of the control pulse to 100% results in the switching device being held in the on condition, in effect directly connecting the fuel cell 11 and the battery 13A. Thus the output voltage of the fuel cell 11 and the battery 13A terminal voltage assume the same value.

Furthermore, when the duty ratio of the control pulse is set appropriately between 0% and 100%, the current and voltage controller 12 restricts the output current of the fuel cell 11, in other words, the primary current, as appropriate in accordance the duty ratio of the control pulse, and the restricted current thus obtained is output as the secondary current.

The output controller 14 is provided with, for example, a PWM inverter which uses pulse width modulation (PWM), and controls the drive and regenerative action of the propulsion motor 15 corresponding to control commands output from the control apparatus 20. For example, when the propulsion motor 15 is driven, DC power output from the current and voltage controller 12 and the battery 13A is converted to three-phase AC power based on a torque command input from the control apparatus 20, and supplied to the propulsion motor 15. On the other hand, during regeneration with the propulsion motor 15, the three-phase AC power output from the propulsion motor 15 is converted to DC power and supplied to the battery 13A to charge the battery 13A.

Furthermore, the control apparatus 20 controls the regenerative operation of the propulsion motor 15 based on the travelling state of the vehicle, for example the speed of the vehicle (speed), or the state of the battery 13A, for example, the temperature of the battery 13A, the detected value of the terminal voltage of the battery 13A, the detected value of the current charged to the battery 13A, or the like.

Therefore, to the control apparatus 20 is input for example: a detection signal output from the fuel cell unit voltage sensor 21 which detects the terminal voltage (fuel cell unit voltage) of the multiple fuel cell units including the fuel cell 11; a detection signal output from the output current sensor (not shown in drawings) which detects the value of the output current extracted from the fuel cell 11; a detection signal output from the output voltage sensor (not shown in drawings) which detects the output voltage of the fuel cell 11; a detection signal output from the battery voltage sensor 23A which detects the terminal voltage of the battery 13A; a detection signal output from the battery current sensor 24A which detects the battery current charged to the battery 13A; a detection signal output from the battery temperature sensor (not shown in drawings) which detects the temperature of the battery 13A; a detection signal output from the degree of opening of the accelerator sensor 31; a signal output from the IG switch 32 which instructs commencement of operation of the vehicle, and a detection signal output from the speed sensor 33.

Moreover, as described below, the control apparatus 20, at the time of regenerative operation of the propulsion motor 15 such as during deceleration of the fuel cell vehicle, calculates the regenerative electric power which can be generated based on the vehicle condition, for example on the speed of the vehicle or the like. Furthermore, the control apparatus 20 calculates the chargeable power which can be charged to the battery 13A based for example on the detected value of the terminal voltage of the battery 13A or the like.

Then, the control apparatus 20, in the case where the chargeable power which can be charged to the battery 13A is greater than the regenerative electric power which can be generated by the propulsion motor 15, makes the duty ratio of the control pulse output to the current and voltage controller 12, 100%, and sets the fuel cell 11 and the battery 13A to a directly connected condition. Moreover, the control apparatus 20 outputs to the S/C output controller 17 a power generation command corresponding to the detection value of the terminal voltage of the battery 13A which has become the same value as the output voltage of the fuel cell 11, to perform supply of reactant gas in accordance with the power generation command, so that the battery 13A is charged by the power generation power of the fuel cell 11 and the regenerative electric power of the propulsion motor 15.

On the other hand, in the case where the chargeable power which can be charged to the battery 13A is less than the regenerative electric power which can be generated by the propulsion motor 15, the control apparatus 20 sets the duty ratio of the control pulse input to current and voltage controller 12 to be 20%, 30%, etc. so that flow of electric current from the fuel cell 11 to the battery 13A is restricted, or the control apparatus 20 makes the duty ratio of the control pulse input to current and voltage controller 12, 0%, to electrically disconnect the fuel cell 11 and the battery 13A, and prohibit charging of the battery 13A by the power generation power of the fuel cell 11. The duty ratio of the control pulse may be determined depending on the chargeable power which can be charged to the battery 13A.

The fuel cell vehicle system 110 according to the second embodiment has the aforementioned configuration. Next is a description of the operation of the fuel cell vehicle system 110, in particular the operation during travelling of the fuel cell vehicle, with reference to the appended drawings.

Figure 5:
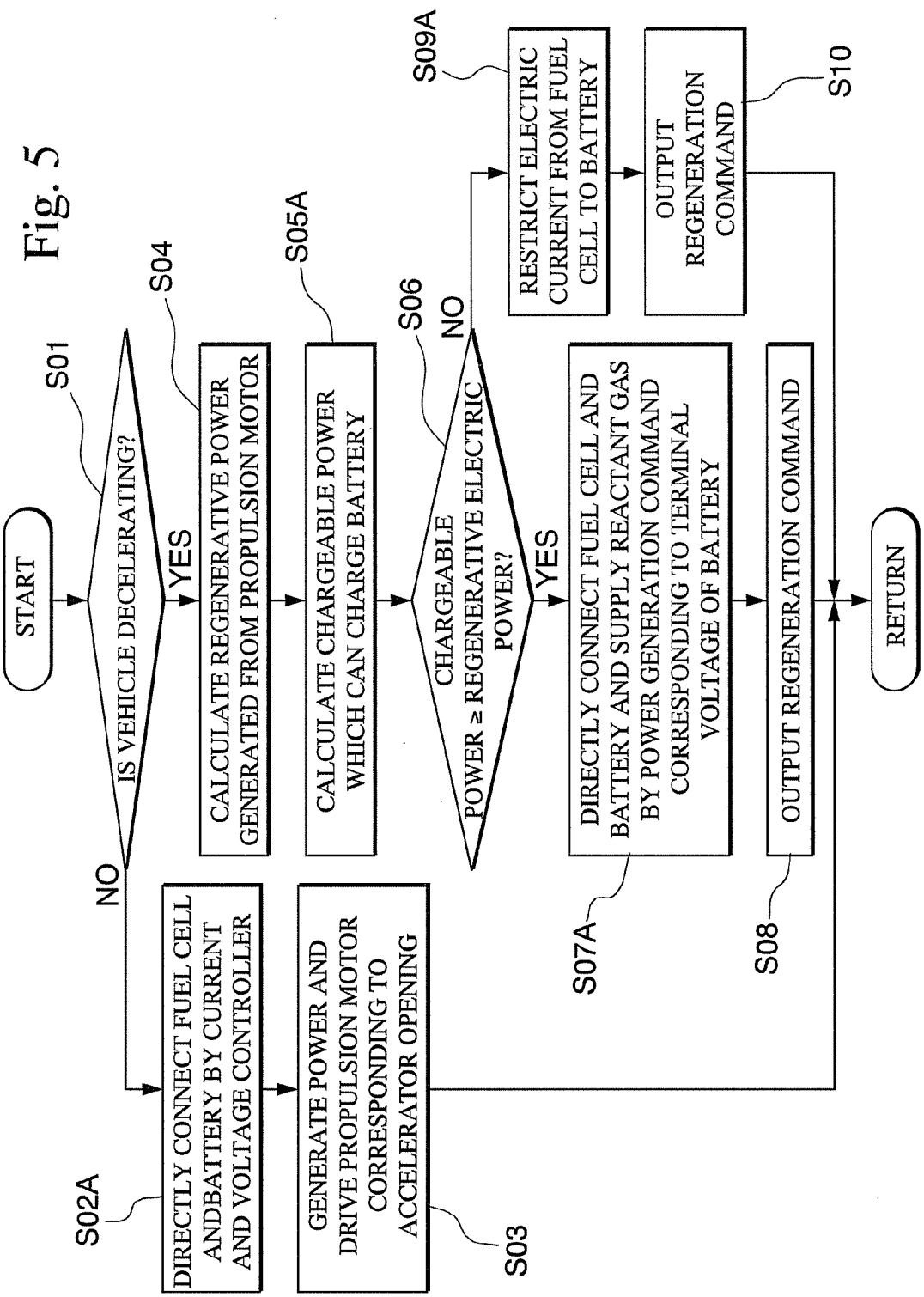
FIG. 5 is a flowchart showing an operation of the fuel cell vehicle system shown in FIG. 4.

At first, in step S01 of FIG. 5, it is determined whether or not the fuel cell vehicle is decelerating, according to for example a time change of the opening of the accelerator related to the accelerator operation amount of the driver, or for example the direction of the current being charged to the battery 13A, that is whether this is a charging current or a discharge current, or the like.

If the determination result is YES, the flow proceeds to the next step S04.

On the other hand if the determination result is NO, the flow proceeds to step S02A.

In step S02A, the duty ratio of the control pulse input to current and voltage controller 12 is set to 100%, and the fuel cell 11 and the battery 13A are set to a directly connected condition.

Then, in step S03, a power generation command corresponding for example to the degree of opening of the accelerator related to the accelerator operation amount of the driver or the like, is output to the S/C output controller 17, and also a torque command corresponding to the degree of opening of the accelerator or the like is output to the output controller 14, so that the propulsion motor 15 is driven by the power supply from the fuel cell 11, and this series of processing then ends.

Furthermore, in step S04, based on the vehicle travelling conditions, for example the speed of the vehicle or the like, the regenerative electric power which can be generated by the regenerative operation of the propulsion motor 15 is calculated.

Next, in step S05A, based for example on the detection value of the terminal voltage of the battery 13A or the like, the chargeable power which can be charged to the battery 13A is calculated.

Then, in step S06, it is determined whether or not the chargeable power which can be charged to the battery 13A is greater than the regenerative electric power which can be generated by the propulsion motor 15.

In the case where the determination result is NO, the flow proceeds to the next step S09A.

On the other hand, in the case where the determination result is YES, the flow proceeds to step S07A.

In step S07A, the duty ratio of the control pulse output to the current and voltage controller 12 is set to 100%, and the fuel cell 11 and the battery 13A are set to the directly connected condition, and also a power generation command corresponding to the detection value of the terminal voltage of the battery 13A which has become the same value as the output voltage of the fuel cell 11, is output to the S/C output controller 17, and supply of reactant gas is performed corresponding to the power generation command for the fuel cell 11, so that the battery 13A is charged by the power generation power of the fuel cell 11.

Then, in step S08, a regeneration command is output to the output controller 14, and the three phase AC power output from the propulsion motor 15 due to the regeneration operation, is converted to DC regenerative electric power by the output controller 14, and the battery 13A is charged by this regenerative electric power, and the series of processing ends.

Furthermore, in step S09A, the duty ratio of the control pulse input to current and voltage controller 12 is set to be 20%, 30%, etc. so that flow of electric current from the fuel cell 11 to the battery 13A is restricted, or the duty ratio of the control pulse input to current and voltage controller 12 is set to 0%, and the fuel cell 11 and the battery 13A are electrically disconnected, so that charging of the battery 13A by means of the power generation power of the fuel cell 11 is prohibited.

Then, in step S10, a regeneration command is output to the output controller 14, and the three phase AC power output from the propulsion motor 15 due to the regenerative operation is converted to DC regenerative power by the output controller 14, and the battery 13A is charged by this regenerative electric power, and the series of processing ends.

As described above, according to the fuel cell vehicle system 110 of the second embodiment, in the case where the chargeable power which can be charged to the battery 13A is greater than the regenerative electric power which can be generated by the regeneration operation of the propulsion motor, the restriction on the output current of the fuel cell 11 is cancelled, so that the battery 13A can be quickly charged by the power generation power of the fuel cell 11 and the regenerative electric power of the propulsion motor 15.

On the other hand, when the chargeable power is less than the regenerative electric power, the output current of the fuel cell 11 is restricted. As a result, the battery being over charged by the power generation of the fuel cell can be prevented, and the energy efficiency of the fuel cell vehicle during regenerative operation of the propulsion motor 15 can be improved.

In the above described second embodiment, in the case where the chargeable power which can be charged to the battery 13A is less than the regenerative electric power which can be generated by the propulsion motor 15, charging of the battery 13A by the power generation power of the fuel cell 11 is simply restricted or prohibited. However, this is not limiting, and for example as in the flowchart shown in FIG. 6 showing the operation of the fuel cell vehicle system 110 according to a modified example of the second embodiment, the operation of current and voltage controller 12 may further be controlled corresponding to the electrode gap differential pressure of the anode and cathode of the fuel cell 11.

In this modified example of the second embodiment, the point different from the second embodiment is that in the case where the determination result in step S06 is NO, the flow proceeds to step S21.

Hereunder, parts the same as for the second embodiment are denoted by the same reference symbols, and description is omitted.

Figure 6:
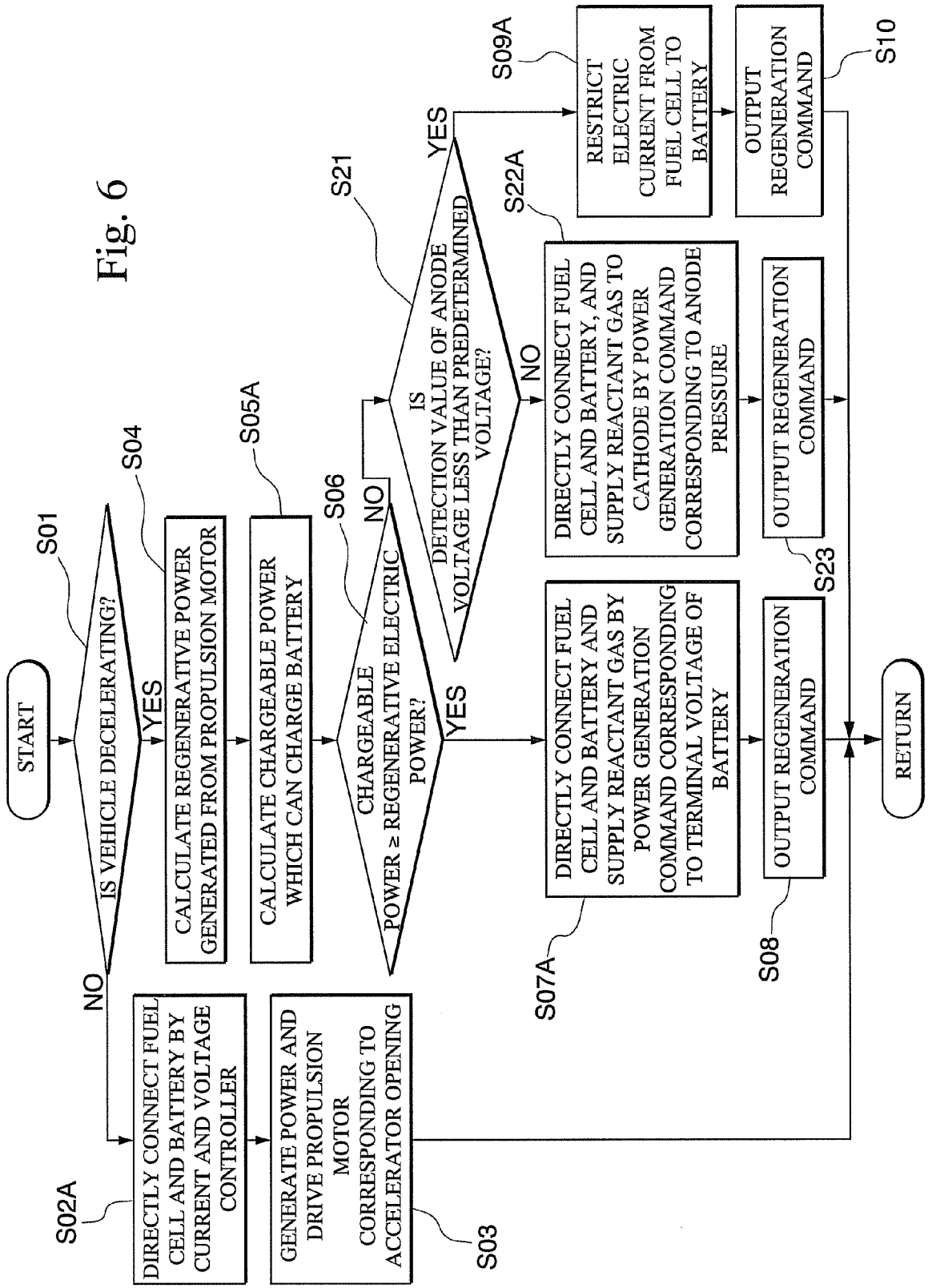
FIG. 6 is a flowchart showing an operation of the fuel cell vehicle system according to a modified example of the second embodiment.

That is to say, in step S21 in FIG. 6, it is determined whether or not the detection result of the pressure (anode pressure) of the reactant gas at the anode of the fuel cell 11 is less than a predetermined pressure.

In the case where the determination result is YES, the flow proceeds to the aforementioned step S09A.

On the other hand, in the case where the determination result is NO, the flow proceeds to step S22A.

In step S22A, the duty ratio of the control pulse input to current and voltage controller 12 is made 100% so that the fuel cell 11 and the battery 13A are set to the directly connected condition. Also the power generation command corresponding to the detection value of the anode pressure is output to the S/C output controller 17, and supply of reactant gas (air) is performed corresponding to the power generation command for the cathode of the fuel cell 11, so that power generation is performed in a condition where the differential pressure of the electrode gap of the anode and the cathode of the fuel cell 11 is maintained at a predetermined differential pressure condition, and the battery 13A is charged by the power generation power of the fuel cell 11.

Then, in step S23, a regeneration command is output to the output controller 14, and the three phase AC power output from the propulsion motor 15 is converted to DC regenerative power by means of the output controller 14, and the battery 13A is then charged by this regenerative electric power, and the series of processing ends.

That is, in the case where the pressure of the hydrogen at the anode of the fuel cell 11 is greater than a predetermined pressure, even though the chargeable power is less than the regenerative electric power, the restriction on the output current of the fuel cell 11 is cancelled so that power generation continues. As a result, an excessive increase in the differential pressure of the electrode gap between the anode and the cathode of the fuel cell 11 can be prevented.

Next, a fuel cell vehicle system according to a third embodiment of the present invention will be described with reference to the appended drawings. It should be noted that parts the same as for the first and second embodiments are denoted by the same reference symbols, and detailed description is omitted.

Figure 7:
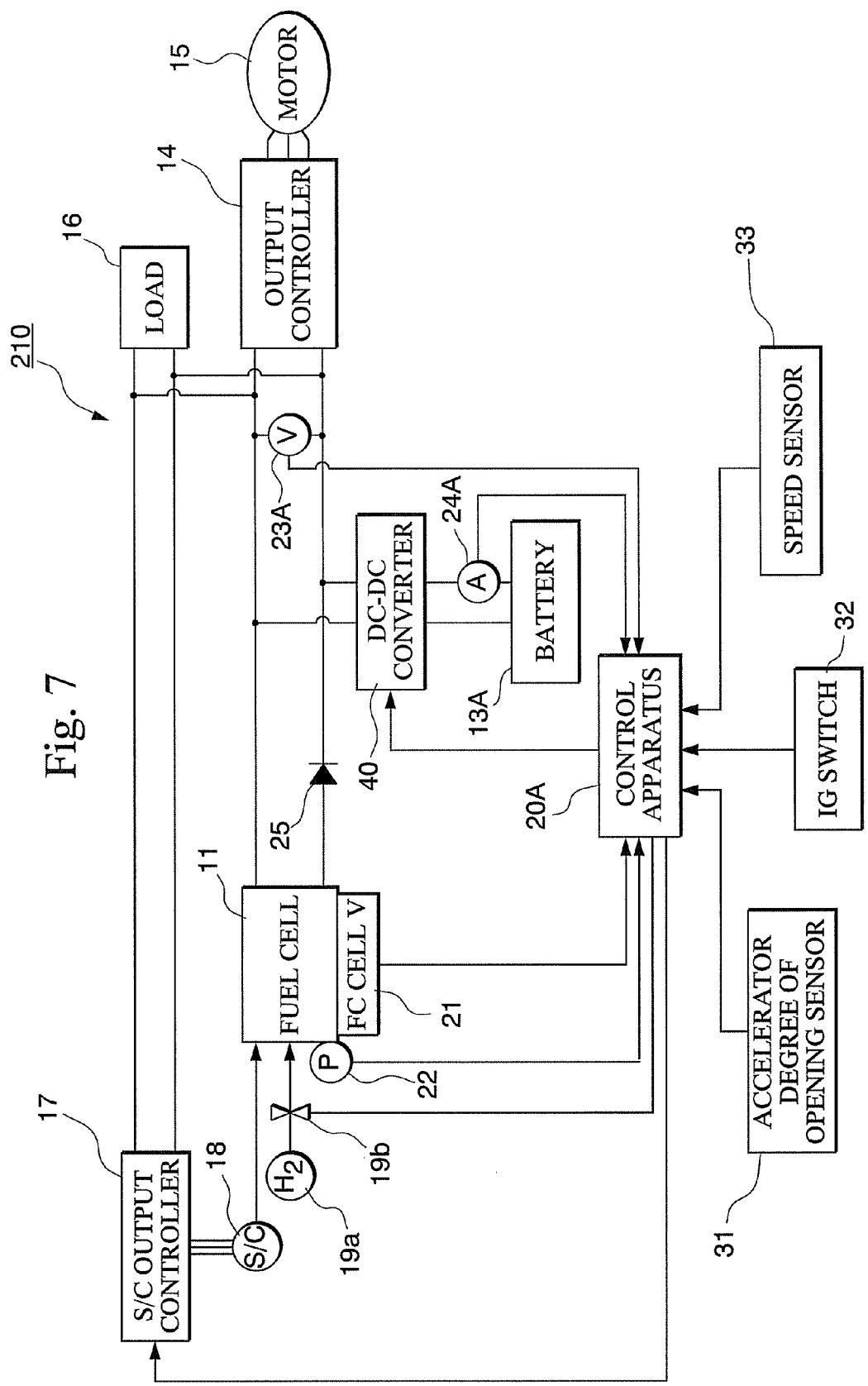
FIG. 7 is a block diagram of a fuel cell vehicle system according to a third embodiment of the present invention.

As shown in FIG. 7, similarly to the second embodiment, a fuel cell vehicle system 210 according to the third embodiment includes a battery 13A as an energy storage device. In addition, the fuel cell vehicle system 210 includes a DC-DC-converter 40 instead of the current and voltage controller 12 in the first and second embodiments. More specifically, the fuel cell vehicle system 210 according to the third embodiment includes: the fuel cell 11, the DC-DC-converter 40, the battery 13A, the output controller 14, the propulsion motor 15, the load 16, an S/C output controller 17, the air compressor (S/C) 18, the hydrogen tank 19a and hydrogen supply valve 19b, the control apparatus 20A, the fuel cell unit voltage sensor 21, the anode voltage sensor 22, a battery voltage sensor 23A, a battery current sensor 24A, the degree of opening of the accelerator sensor 31, the IG switch 32, the speed sensor 33, and a diode 25. As will be described below, the control apparatus 20A differs from the control apparatus 20 in the first and second embodiments in that it controls the V2 voltage of the DC-DC-converter 40. Other components are identical to that of the second embodiment.

The generated current (output current) extracted from the fuel cell 11 is input to the propulsion motor 15 via the output controller 14. On the current flow path, the DC-DC-converter 40 is connected, and the battery 13A (e.g., a nickel hydride battery, a lithium ion battery, an lead acid battery, etc.) is connected to the DC-DC-converter 40.

The DC-DC-converter 40 controls the output current of the fuel cell 11 by controlling the V2 voltage measured by the battery voltage sensor 23A.

Figure 10:
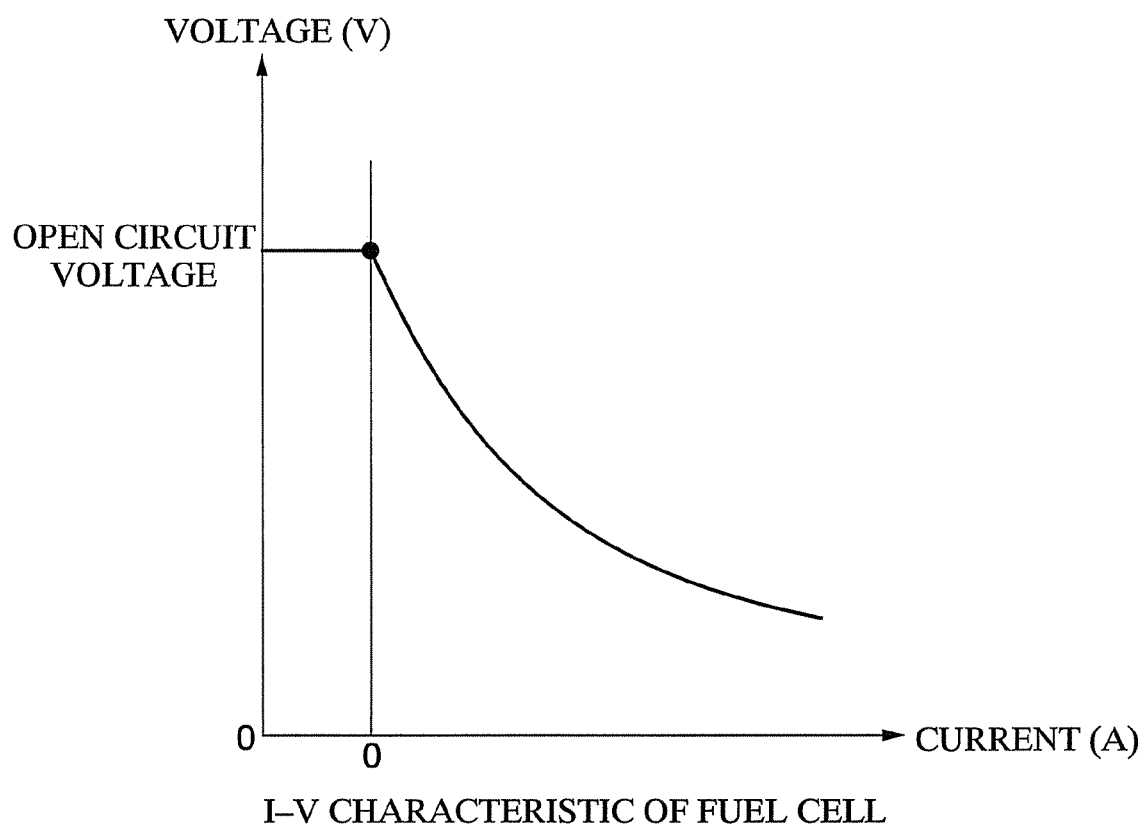
FIG. 10 is a graph showing the I-V characteristic of a fuel cell.

In general, a fuel cell exhibits an I-V characteristic as shown in FIG. 10. More specifically, when the V2 voltage is increased, the output current of the fuel cell is reduced, and when the V2 voltage is equal to or greater than an open circuit voltage, the output current becomes zero.

Accordingly, when the extraction of the output current of the fuel cell 11 is to be restricted, the V2 voltage is set to be a value greater than a normal command value, and when the extraction of the output current of the fuel cell 11 is to be prohibited, the V2 voltage is set to the open circuit voltage. Moreover, when the duty ratio of the DC-DC converter 40 is set to 100%, the output current of the fuel cell 11 flows to the battery 13A without restriction, i.e., the fuel cell 11 and the battery 13A are in a so-called directly connected state. When the duty ratio is set to 100%, the switching elements of the DC-DC converter 40 are fixed in the ON state (i.e., switching operations do not occur); therefore, energy loss is minimized, and a charging operation with a high efficiency can be performed.

The output controller 14 is provided with, for example, a PWM inverter which uses pulse width modulation (PWM), and controls the drive and regenerative action of the propulsion motor 15 corresponding to control commands output from the control apparatus 20A. For example, when the propulsion motor 15 is driven, DC power output from the current and voltage controller 12 and the battery 13A is converted to three-phase AC power based on a torque command input from the control apparatus 20A, and supplied to the propulsion motor 15. On the other hand, during regeneration with the propulsion motor 15, the three-phase AC power output from the propulsion motor 15 is converted to DC power and supplied to the battery 13A to charge the battery 13A.

Furthermore, the control apparatus 20A controls the regenerative operation of the propulsion motor 15 based on the travelling state of the vehicle, for example the speed of the vehicle (speed), or the state of the battery 13A, for example, the temperature of the battery 13A, the detected value of the terminal voltage of the battery 13A, the detected value of the current charged to the battery 13A, or the like.

Therefore, to the control apparatus 20A is input for example: a detection signal output from the fuel cell unit voltage sensor 21 which detects the terminal voltage (fuel cell unit voltage) of the multiple fuel cell units including the fuel cell 11; a detection signal output from the output current sensor (not shown in drawings) which detects the value of the output current extracted from the fuel cell 11; a detection signal output from the output voltage sensor (not shown in drawings) which detects the output voltage of the fuel cell 11; a detection signal output from the battery voltage sensor 23A which detects the terminal voltage of the battery 13A; a detection signal output from the battery current sensor 24A which detects the battery current charged to the battery 13A; a detection signal output from the battery temperature sensor (not shown in drawings) which detects the temperature of the battery 13A; a detection signal output from the degree of opening of the accelerator sensor 31; a signal output from the IG switch 32 which instructs commencement of operation of the vehicle, and a detection signal output from the speed sensor 33.

Moreover, as described below, the control apparatus 20A, at the time of regenerative operation of the propulsion motor 15 such as during deceleration of the fuel cell vehicle, calculates the regenerative electric power which can be generated based on the vehicle condition, for example on the speed of the vehicle or the like. Furthermore, the control apparatus 20A calculates the chargeable power which can be charged to the battery 13A based for example on the detected value of the terminal voltage of the battery 13A or the like.

Then, the control apparatus 20A, in the case where the chargeable power which can be charged to the battery 13A is greater than the regenerative electric power which can be generated by the propulsion motor 15, sets the duty ratio of the DC-DC-converter 40 to 100% so that electric current from the fuel cell 11 to the battery 13A is not restricted. Moreover, the control apparatus 20A outputs to the S/C output controller 17 a power generation command corresponding to the detection value of the terminal voltage of the battery 13A which has become the same value as the output voltage of the fuel cell 11, to perform supply of reactant gas in accordance with the power generation command, so that the battery 13A is charged by the power generation power of the fuel cell 11 and the regenerative electric power of the propulsion motor 15.

On the other hand, in the case where the chargeable power which can be charged to the battery 13A is less than the regenerative electric power which can be generated by the propulsion motor 15, the control apparatus 20A sets the V2 voltage of the DC-DC-converter 40 to a value greater than the normal command value so that the extraction of the output current from the fuel cell 11 is restricted, or the control apparatus 20A sets the V2 voltage of the DC-DC-converter 40 to the open circuit voltage so as to electrically disconnect the fuel cell 11 and the battery 13A, and prohibits charging of the battery 13A by the power generation power of the fuel cell 11. The V2 voltage of the DC-DC-converter 40 may be determined depending on the chargeable power which can be charged to the battery 13A.

The fuel cell vehicle system 210 according to the third embodiment has the aforementioned configuration. Next is a description of the operation of the fuel cell vehicle system 210, in particular the operation during travelling of the fuel cell vehicle, with reference to the appended drawings.

Figure 8:
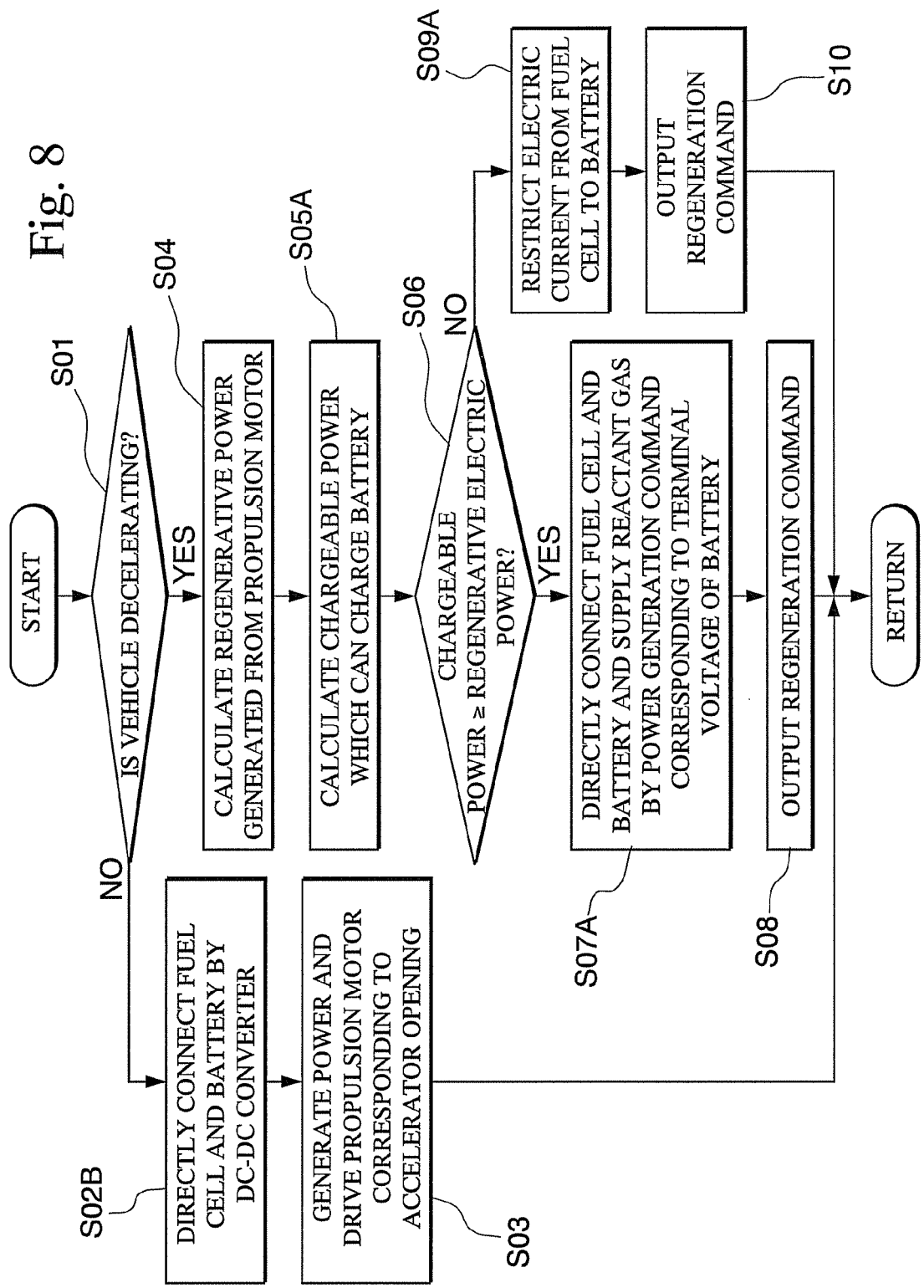
FIG. 8 is a flowchart showing an operation of the fuel cell vehicle system shown in FIG. 7.

At first, in step S01 of FIG. 8, it is determined whether or not the fuel cell vehicle is decelerating, according to for example a time change of the opening of the accelerator related to the accelerator operation amount of the driver, or for example the direction of the current being charged to the battery 13A, that is whether this is a charging current or a discharge current, or the like.

If the determination result is YES, the flow proceeds to the next step S04.

On the other hand if the determination result is NO, the flow proceeds to step S02B.

In step S02B, the duty ratio of the DC-DC-converter 40 is set to 100% so that electric current from the fuel cell 11 to the battery 13A is not restricted.

Then, in step S03, a power generation command corresponding for example to the degree of opening of the accelerator related to the accelerator operation amount of the driver or the like, is output to the S/C output controller 17, and also a torque command corresponding to the degree of opening of the accelerator or the like is output to the output controller 14, so that the propulsion motor 15 is driven by the power supply from the fuel cell 11, and this series of processing then ends.

Furthermore, in step S04, based on the vehicle travelling conditions, for example the speed of the vehicle or the like, the regenerative electric power which can be generated by the regenerative operation of the propulsion motor 15 is calculated.

Next, in step S05A, based for example on the detection value of the terminal voltage of the battery 13A or the like, the chargeable power which can be charged to the battery 13A is calculated.

Then, in step S06, it is determined whether or not the chargeable power which can be charged to the battery 13A is greater than the regenerative electric power which can be generated by the propulsion motor 15.

In the case where the determination result is NO, the flow proceeds to the next step S09A.

On the other hand, in the case where the determination result is YES, the flow proceeds to step S07A.

In step S07A, the duty ratio of the DC-DC-converter 40 is set to 100% so that electric current from the fuel cell 11 to the battery 13A is not restricted, and also a power generation command corresponding to the detection value of the terminal voltage of the battery 13A which has become the same value as the output voltage of the fuel cell 11, is output to the S/C output controller 17, and supply of reactant gas is performed corresponding to the power generation command for the fuel cell 11, so that the battery 13A is charged by the power generation power of the fuel cell 11.

Then, in step S08, a regeneration command is output to the output controller 14, and the three phase AC power output from the propulsion motor 15 due to the regeneration operation, is converted to DC regenerative electric power by the output controller 14, and the battery 13A is charged by this regenerative electric power, and the series of processing ends.

Furthermore, in step S09A, the V2 voltage of the DC-DC-converter 40 is set to a value greater than the normal command value so that the extraction of the output current from the fuel cell 11 is restricted, or the V2 voltage is set to the open circuit voltage so as to electrically disconnect the fuel cell 11 and the battery 13A, so that charging of the battery 13A by means of the power generation power of the fuel cell 11 is prohibited.

Then, in step S10, a regeneration command is output to the output controller 14, and the three phase AC power output from the propulsion motor 15 due to the regenerative operation is converted to DC regenerative power by the output controller 14, and the battery 13A is charged by this regenerative electric power, and the series of processing ends.

As described above, according to the fuel cell vehicle system 210 of the third embodiment, in the case where the chargeable power which can be charged to the battery 13A is greater than the regenerative electric power which can be generated by the regeneration operation of the propulsion motor, the restriction on the output current of the fuel cell 11 is cancelled, so that the battery 13A can be quickly charged by the power generation power of the fuel cell 11 and the regenerative electric power of the propulsion motor 15.

On the other hand, when the chargeable power is less than the regenerative electric power, the output current of the fuel cell 11 is restricted. As a result, the battery being overcharged by the power generation of the fuel cell can be prevented, and the energy efficiency of the fuel cell vehicle during regenerative operation of the propulsion motor 15 can be improved.

In the above described third embodiment, in the case where the chargeable power which can be charged to the battery 13A is less than the regenerative electric power which can be generated by the propulsion motor 15, charging of the battery 13A by the power generation power of the fuel cell 11 is simply restricted or prohibited. However, this is not limiting, and for example as in the flowchart shown in FIG. 9 showing the operation of the fuel cell vehicle system 210 according to a modified example of the third embodiment, the operation of the DC-DC-converter 40 may further be controlled corresponding to the electrode gap differential pressure of the anode and cathode of the fuel cell 11.

In this modified example of the third embodiment, the point different from the third embodiment is that in the case where the determination result in step S06 is NO, the flow proceeds to step S21.

Hereunder, parts the same as for the third embodiment are denoted by the same reference symbols, and description is omitted.

Figure 9:
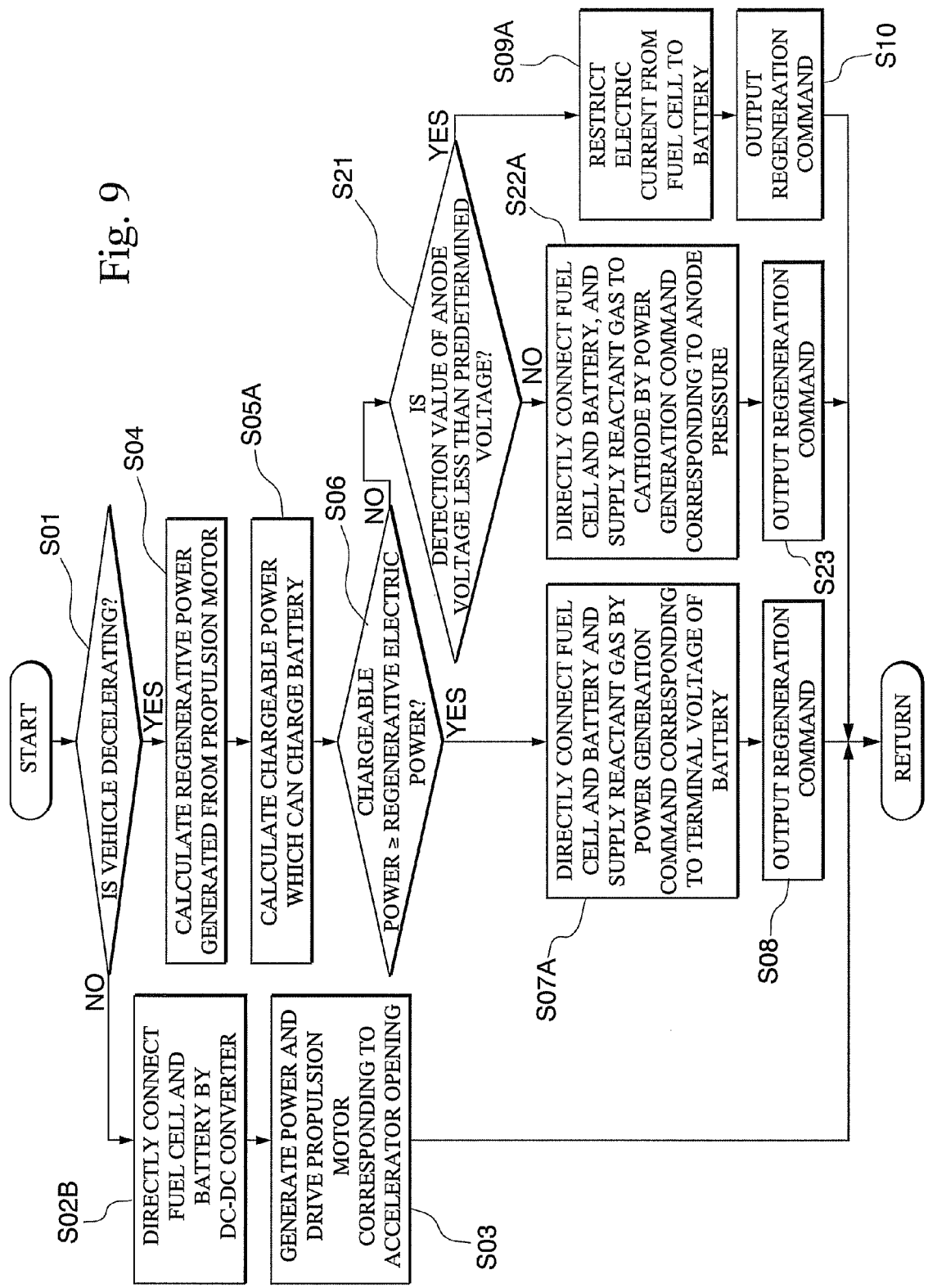
FIG. 9 is a flowchart showing an operation of the fuel cell vehicle system according to a modified example of the third embodiment.

That is to say, in step S21 in FIG. 9, it is determined whether or not the detection result of the pressure (anode pressure) of the reactant gas at the anode of the fuel cell 11 is less than a predetermined pressure.

In the case where the determination result is YES, the flow proceeds to the aforementioned step S09A.

On the other hand, in the case where the determination result is NO, the flow proceeds to step S22A.

In step S22A, the duty ratio of the DC-DC-converter 40 is set to 100% so that electric current from the fuel cell 11 to the battery 13A is not restricted. Also the power generation command corresponding to the detection value of the anode pressure is output to the S/C output controller 17, and supply of reactant gas (air) is performed corresponding to the power generation command for the cathode of the fuel cell 11, so that power generation is performed in a condition where the differential pressure of the electrode gap of the anode and the cathode of the fuel cell 11 is maintained at a predetermined differential pressure condition, and the battery 13A is charged by the power generation power of the fuel cell 11.

Then, in step S23, a regeneration command is output to the output controller 14, and the three phase AC power output from the propulsion motor 15 is converted to DC regenerative power by means of the output controller 14, and the battery 13A is then charged by this regenerative electric power, and the series of processing ends.

That is, in the case where the pressure of the hydrogen at the anode of the fuel cell 11 is greater than a predetermined pressure, even though the chargeable power is less than the regenerative electric power, the restriction on the output current of the fuel cell 11 is cancelled so that power generation continues. As a result, an excessive increase in the differential pressure of the electrode gap between the anode and the cathode of the fuel cell 11 can be prevented.

As described above, according to the fuel cell vehicle system of the first aspect of the present invention, the energy storage device (capacitor, battery, etc.) can be promptly charged by the power generation of the fuel cell and by the regenerative operation of the propulsion motor. Also overcharging of the energy storage device by the power generation of the fuel cell can be prevented, thus enabling the energy efficiency of the fuel cell vehicle during regenerative operation of the propulsion motor to be improved.

Moreover according to the fuel cell vehicle system of the second aspect of the present invention, the energy storage device can be promptly charged by the power generation of the fuel cell and by the regenerative operation of the propulsion motor. Also, while maintaining protection of the fuel cell, excessive charging of the energy storage device due to the power generation of the fuel cell can be prevented, and the energy efficiency of the fuel cell vehicle at the time of regenerative operation of the propulsion motor can be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

What is claimed is:

1. A fuel cell vehicle system comprising:
a propulsion motor capable of driving a vehicle;
a fuel cell which generates electric power by supplying a reactant gas to give an electrochemical reaction;
an energy storage device which is charged by a generated output of the fuel cell and regenerative electric power of the propulsion motor;
an output control device which controls an output current of the fuel cell; and
a control device which calculates the regenerative electric power which can be generated by a regenerative operation of the propulsion motor as well as a chargeable power which can be charged to the energy storage device, controls the output control device so that the output current of the fuel cell is restricted when the chargeable power is less than the regenerative electric power, and controls the output control device so that restriction on the output current of the fuel cell is canceled when the chargeable power is equal to or greater than the regenerative electric power.

2. A fuel cell vehicle system comprising:
a propulsion motor capable of driving a vehicle;
a fuel cell which includes fuel cell units, each of which includes a fuel electrode and an oxygen electrode, and generates electric power by supplying a reactant gas to give an electrochemical reaction;
an energy storage device which is charged by a generated output of the fuel cell and regenerative electric power of the propulsion motor;
a reactant gas supply device which supplies the reactant gas to the fuel cell;
a pressure detection device which detects a pressure of the reactant gas supplied to the fuel electrode of the fuel cell;
an output control device which controls an output current of the fuel cell; and
a control device which calculates the regenerative electric power which can be generated by a regenerative operation of the propulsion motor as well as a chargeable power which can be charged to the energy storage device, controls the reactant gas supply device so that supply of the reactant gas to the oxygen electrode of the fuel cell is stopped and controls the output control device so that the output current of the fuel cell is restricted when the chargeable power is less than the regenerative electric power and the pressure of the reactant gas detected by the pressure detection device is equal to or less than a predetermined value, and controls the output control device so that restriction on the output current of the fuel cell is canceled when the chargeable power is equal to or greater than the regenerative electric power or the chargeable power is less than the regenerative electric power and the pressure of the reactant gas detected by the pressure detection device is greater than the predetermined value.

* * * * *